Nov. 5, 1963 F. FALLA 3,109,718
APPARATUS FOR ROASTING SEEDS
Filed Nov. 29, 1960 2 Sheets-Sheet 1
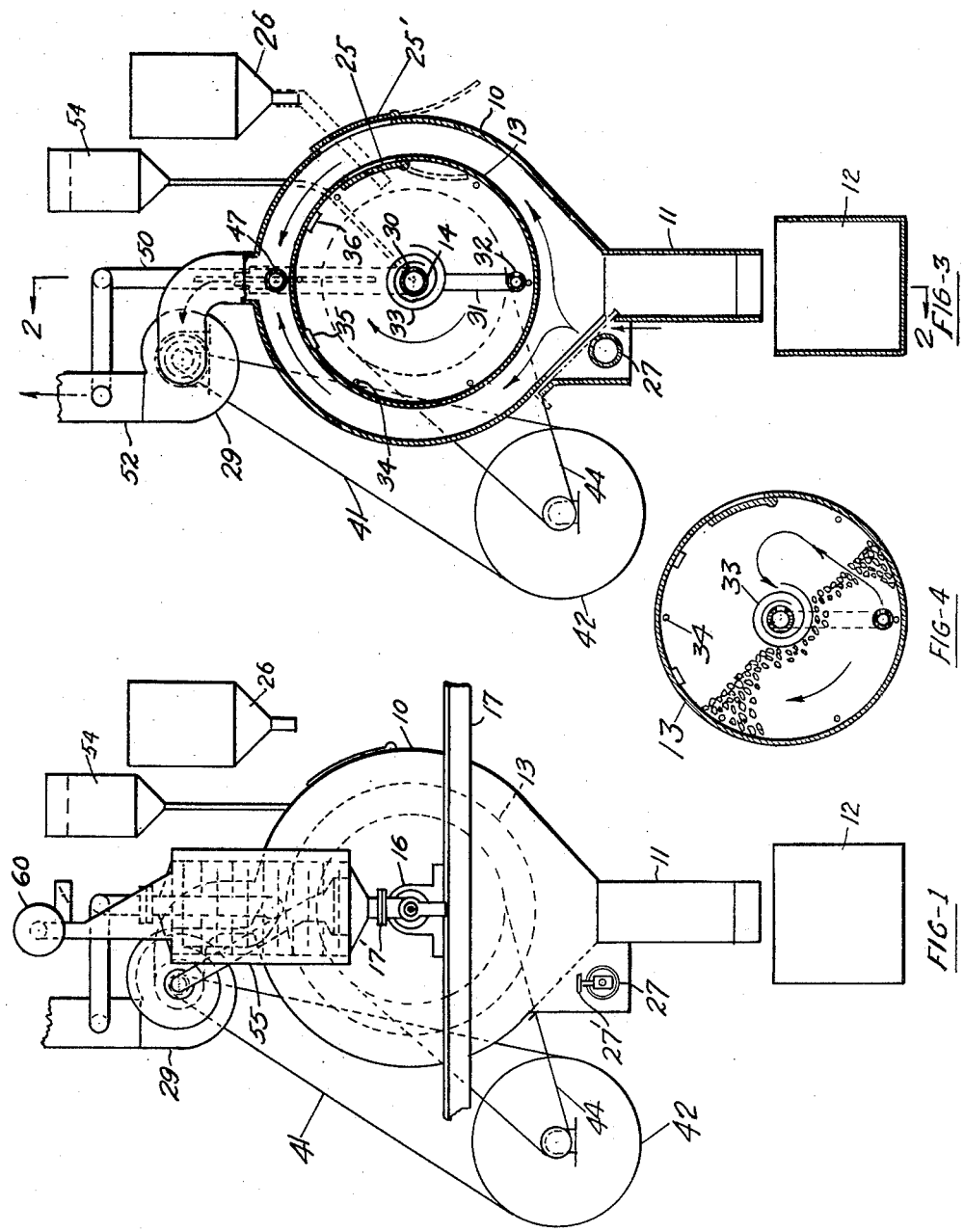
INVENTOR.
FERNANDO FALLA
BY
ATTORNEY Nov. 5, 1963
F. FALLA
3,109,718
APPARATUS FOR ROASTING SEEDS
Filed Nov. 29, 1960
2 Sheets-Sheet 2
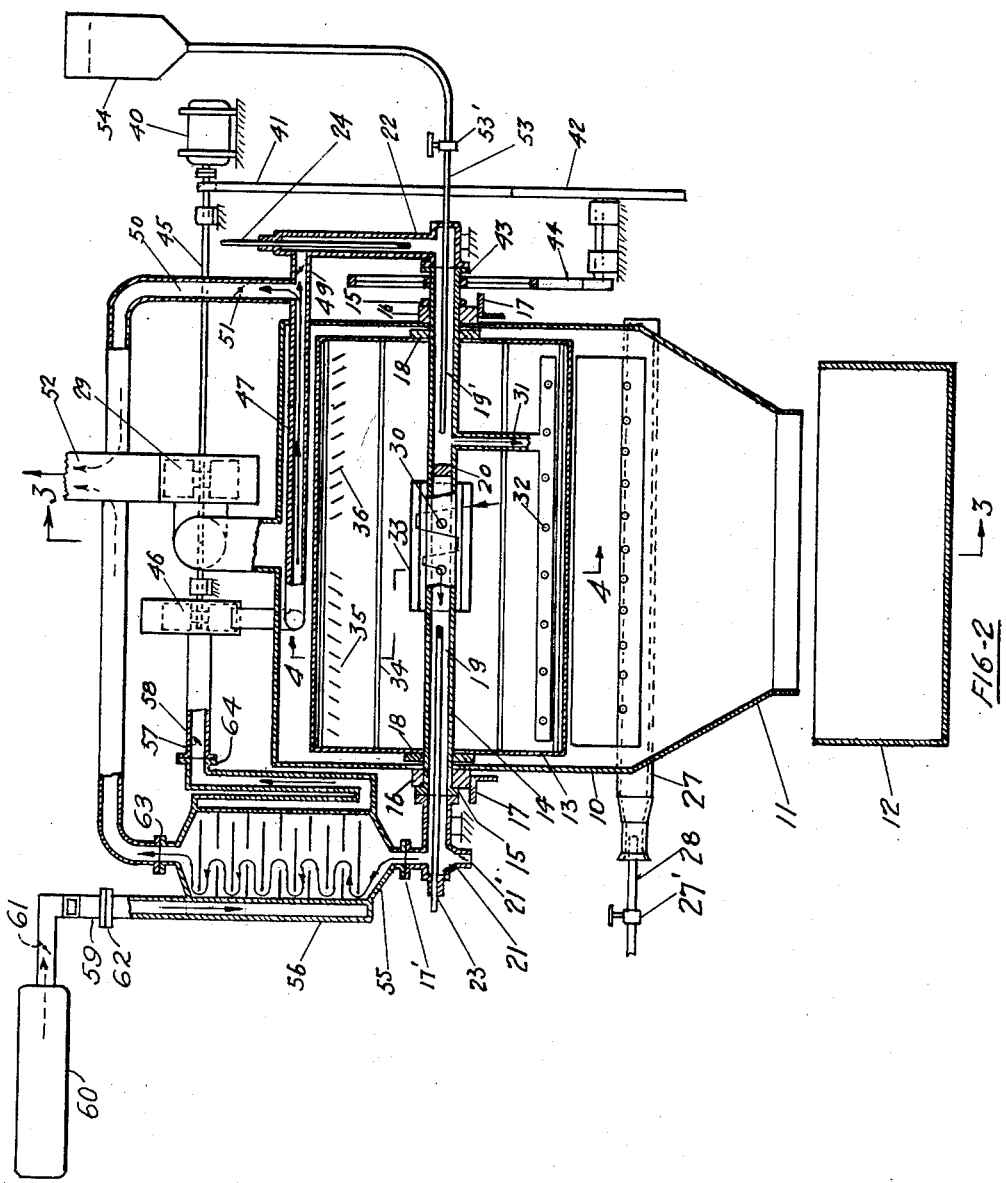
INVENTOR.
FERNANDO FALLA
BY
*Fred'k W. Schuetz*
ATTORNEY

United States Patent Office 3,109,718
Patented Nov. 5, 1963

3,109,718
APPARATUS FOR ROASTING SEEDS
Fernando Falla, 59 Elm St., Millburn, N.J.
Filed Nov. 29, 1960, Ser. No. 72,494
5 Claims. (Cl. 34—77)

The invention relates to a novel method of, and apparatus for, roasting seeds such as of cotton, castor, almond and peanut plants, etc., and particularly coffee beans; and it is directed more especially to the elimination, during the roasting period, of valuable volatiles generated by the roasting operation, as well as oils and waxes.

It has for an object to eliminate the foregoing in a novel manner; and to afford, for example, in the case of coffee beans, a substantially caffeine-free product.

To this end, caffeine, as well as evolved light and heavy oils and waxes of the coffee beans, are condensed in a novel manner which includes their ready removal, as generated.

In accordance with the invention, the roasting operation is to be conducted—in the case of coffee beans—somewhat above the temperature at which caffeine will be sublimed out of such beans. Thus, the separation of the generated caffeine and other valuable volatiles is to be accomplished during the roasting operation by a scouring flow of air which, to this end, is directed through the mass of green beans being roasted. The volume of such air, moreover, is maintained relatively small in order to concentrate the generated volatiles for their more ready removal from the roaster apparatus and subsequent delivery into a condenser apparatus.

Present methods of separating oils from seeds are by subjecting the seeds, in a cold condition, to a compressing action of a hydraulic press or the like. This method does not remove all the oil in the seed, large amounts of oil remain in the cake. This invention removes all the oil in the seed by boiling them out in a vapor condition. Oils cannot stay in the seed. Vapor volumes are extremely larger than liquid volumes.

In practising the present methods of roasting coffee the use abnormal volumes of air in order to sweep out the roasting gases or air-volatile mixture, it is difficult to condense such large volumes of odoriferous compounds escaping the roaster. These must then be treated (consumed) in an external incinerator to avoid odor nuisance.

Also, for example, in the case of coffee beans, to obtain caffeine-free, roasted coffee beans, it is the present practice to treat, prior to the roasting operation, such beans with a special solvent, for example, a phenol, to effect the dissolving out of said caffeine. The latter may then be subsequently recovered by evaporation of the solvent. In such a process, a serious disadvantage is present however, as said solvent removes also many of the aromatic compounds from the beans, as well as leaving traces of caffeine—with the result that the so roasted coffee beans lack then desirable aromatic flavors.

A very important advantage of this process is that, since the imprisoned silver skin in the coffee beans has a volatile that is generated at the roasting temperature and it has an extreme affinity for oxygen, it follows that at the roasting temperature, the coffee beans begin to burn in an ambient of air. In this process I have found out that the temperature leaving the interior of the roaster, takes a sudden climb when this combustion takes place inside of the beans. By plotting the temperature leaving the roaster against time, the proper roasting temperature for each brand of coffee is detected. It has been proven that coffees of different localities have a different roasting temperature. As for instance, low land coffee has a silver skin that burns earlier than those from high lands. Further proof of this fact is, by analysis of the gases leaving the roaster. I have found that carbon dioxide begins to appear in the gases leaving the roaster at the roasting temperature, increasing very rapidly as the temperature rises. Further, coffee must be quenched immediately at the end of the roasting to prevent the burning of the coffee.

In carrying out the invention, the valuable volatiles generated, when and as liberated during the roasting operation, are continuously being withdrawn or swept out of the roaster by passing a stream of heated scouring air through the mass of beans. The volume of such air is relatively small with respect to the said mass of green beans; and the temperature thereof is slightly in excess of the subliming point of caffeine. The spent products may then be disposed of in any desired manner, as by condensing the same, or they may be wholly discarded.

In cases when roasting seeds that contain large amounts of oils like castor oil, peanuts, cotton seed and the like, the oils will boil out off the seed just before it is roasted and such oils will be condensed in the condenser. The condenser is provided with a drain valve outlet so as to drain the condenser when the roasting is in progress, some seeds contain large amounts of oils. It is to be noted that for best and most efficient operation, the temperature of the scouring flow of air, must be at the same temperature as that of the seeds being roasted. To accomplish this, valve means are provided at the blower fan inlet and outlet channels. Increasing the fan intake will reduce the temperature and reducing it will raise the scouring temperature, through 47.

By this novel process, not only will the objectionable odors normally present in the vicinity of coffee roasters not prevail, but recovery of valuable portions thereof are readily effected.

The nature of the invention, however, will best be understood when described in connection with the accompanying drawings, in which:

FIG. 1 is an end elevation of the novel roaster.

FIG. 2 is a longitudinal vertical section therethrough.

FIG. 3 is a transverse vertical section, taken on the line 3—3, FIG. 2 of the drawings and looking in the direction of the arrows.

FIG. 4 is a transverse section through the roasting drum.

Referring to the drawings, the novel roaster apparatus shown is designed, for example, for the roasting of coffee beans and comprises a cylindrical housing 10 provided with a bottom outlet spout 11 for discharge of the roasted beans, for example, into a receptacle 12 which is located beneath the roasting drum 13. The latter is shown as mounted upon a tubular shaft 14 to which it may be secured by means of end slip-flanges 15. The said shaft in turn is supported in external bearings 16 carried by respective frame-angle supports 17—end collars 18 being secured to said tubular shaft 14 beyond the bearings to retain said roasting drum 13.

The said shaft 14, in accordance with the invention, is divided longitudinally into two chambers 19 and 19' as by means of an intermediate plug 20 and for the purpose hereinafter set forth. Moreover, the said shaft at its respective ends has secured thereto thermometer wells 21, 22, which support therein respective thermometers 23, 24—said wells being in communication respectively with the corresponding chambers 19, 19'; and the former well being provided with a valved outlet 21'.

In the operation of said roaster, the drum 13 is loaded through swing doors 25, 25', manually opened by swinging them downwardly to the position indicated in dotted lines, FIG. 3 of the drawings. Loading is then effected through a spouted holder 26, FIG. 3, to be inserted through the opening provided. Upon completion of the charge, said holder is to be withdrawn and the doors 25, 25' swung backwardly to seal said roasting drum and housing for conducting the roasting operation.

To effect the latter, heat is applied after the roasting drum is set in motion within the housing 10 immediately beneath the roasting drum 13, for example, by means of an elongated gas burner 27 supplied with gaseous fuel through a valve 27' and tube 28. The spent gases are discharged through the action of a suction fan 29 in communication with the upper portion of the housing 10.

On FIGURE 3 it shows burner 27 directly heating the roasting drum 13, as shown by the arrows that indicate the flow of the combustion gases. Directly above burner 27, in dotted lines, a removable plate is shown that will close the access of the combustion gases to the rotating drum 13. To discharge the roasted coffee from drum 13, first, the firing of the burner 27 is closed, second, the removable plate above burner 27 is inserted, third, drum 13 is stopped so that by visual inspection through opening of loading swing door 25, loading door 25 of drum 13 is accessible for opening manually and door 25 on drum 13 is opened, fourth, drum 13 is set in motion and so discharging its roasted contents into receptacle 12. Sets of plates 35 and 36, see FIGURE 2, will guide every single coffee bean towards open door 25 of roasting drum 13 and so provide for a complete emptying of drum 13.

In addition to the novel design of the tubular shaft 14, on which roaster drum 13 is supported, the interior of the drum is arranged—as through perforations 30 provided in the shaft on one side of the plug 20—to communicate directly with the interior portion 19 of the said tube; while the other portion 19' of the tube communicates indirectly therewith as through the connection 31 for the scouring gas, perforated tube 32. A helically-coiled shield 33, also, is mounted over the perforations 30 to prevent, for example, coffee bean fragments from passing into the shaft 14 through the openings 30—only volatile loaded scouring air being designed thus to pass (as is indicated by the arrows) when the roaster is in operation. The advantage of this helically-coiled shield 33 is that, when roasting large quantities, the helically-coiled shield 33 will be totally buried in the coffee charge and by virtue of the helical shape, any beans falling into the shield will be discharged back into the roaster as the drum 13 turns in the direction of the arrow, as shown on FIGURE 4. Moreover, the interior of said drum is equipped with rods 34 extending parallel to its axis of rotation and which are displaced from the inner surface thereof to prevent the charge from sliding within the drum. Also, sets of plates 35, 36 oppositely inclined toward the longitudinal axis of the drum are provided at the inside of the roasting drum and project inwardly thereof to assist in the emptying of the charge, when required.

Rotation is imparted to said drum during the roasting operation; and this is effected conveniently from an electric motor 40 through a belt 41 and intermediate mechanism connecting the said motor with a pulley 42 of the external portion 43 of the tubular shaft 14 through a further belt 44.

The arrangement is such, moreover, that motor 40 also will drive—but directly through its shaft 45, and therefore, at a much higher rotational velocity—suction draft fans 29, and blower fan 46. The latter fan at its discharge end is connected by means of a duct 47 to the interior of the housing 10 as through the thermometer well 22 and associated portion 19' of the tubular shaft—a valve 49 being introduced in the connection and in advance of the well for control of the flow. A further and discharge conduit 50 in communication with the discharge from fan 29 and provided with control valve 51, permits discharge from fan 46, for partial discharge to the atmosphere, as at 52.

The chamber 19' accommodates a water injection tube 53 which is designed for delivery of water into the drum portion of the roaster for quenching of the charge within said drum—a water supply tank 54 being connected to said tube 53 to this end and the connection being provided with a control valve 53'.

At the scouring air discharge end 19 of the roaster unit, the thermometer well 21 and angle support 17, in addition to affording a support for the thermometer 23, provide support as by means of flanges 17' for a condenser unit 55 which is designed to receive scouring air from the drum 13. The peripheral cooling chamber 56 of said condenser, which is open to the atmosphere at 59, in turn connects through a duct 58 with the suction side of the fan 46. Cooling air may thus be introduced about the condenser chamber 56 as is well understood; and is under control of a valve 57 introduced into the connection immediately in advance of the said fan.

It is very important to maintain the temperature of the scouring air, at thermometer 24, the same as that of thermometer 23 in order to maintain best operation of the roaster, as this scouring air must not do any heating or cooling to the contents of the roaster but simply expedite the removal of the volatiles as they are being formed. In order to make this condition possible valves 57, 51 and 49 are provided in cooperation with duct 47. If the amount of heat absorbed by the scouring air at 56 is not enough, which occurs in most cases, then the necessary extra heat is furnished by duct 47 from the spent combustion gases after serving the roaster drum 13 and the quantity of scouring air entering the roaster at 22 is controlled by valves 49 and 51. It so happens that the scouring air passing at 19 is the same as that entering at 56, however the flow at 19 is loaded with volatiles, the results are that more air is needed at 56 and if the heat added by duct 47 becomes too great, resulting in that temperature at 22 becomes greater than at 19, then the temperature adjusting is made by valves 57 and 51. It is very important to provide valves 51, 49 and 57.

The heated discharge from the fan 46 may be conducted by means of the scouring air reheat duct 47 inside of cylindrical housing 10 and proper setting of the valves 49, 51 to divert said discharge into the well 22 which communicates with the portion 19' of shaft 14 to afford then scouring air into the interior of the said drum.

Valve 57 will control the scouring air temperature, since increasing the air it will lower the air heating and valves 49 and 51 will control the scouring air quantity. It is to be noted that the flow of scouring air current passing through the helically-coiled shield 33 is not capable to carry any of the beans through the discharge 19 of the tubular shaft 14.

The scouring current is a very small amount of air, it serves to only move the volatiles generated during the roasting period and preventing dilution of them. The roasting drum 13 has a hollow shaft, the scouring air current enters at end 19' and after passing through the interior of the roaster 13 leaves at end 19. If no scouring air current is present, the pressure generated inside of the roasting drum 13, as the heat application grows in intensity, will force the volatiles out of the roasting drum 13 in both directions, out at 19 and 19'. In order to prevent this the scouring air current is introduced at 19' and thus guide the volatiles out of drum 13 at 19 and direct the loaded volatile scouring air current into the condenser. It means that such scouring air current is a very small quantity in comparison with the amount of volatiles generated so causing the minimum of air dilution. If no scouring air current is used, end 19' of the tubular shaft 14 will be sealed. In this case only volatiles will flow out of end 19 of shaft 14 and maximum condensation of volatiles will be obtained in the condenser unit 55. However condensation of volatiles will take place in the channels between roaster 13 and condenser 55, a condition that eventually will plug such passages, heavy insulation of this channels will tend to prevent this plugging but volatiles will condense in such channels. The scouring air current, very small, will prevent this and will condense all volatiles in the condenser 55 from where later they can easily be removed. Flanges 17', 62, 63 and 64 will facilitate the exchange of condensers, replace the volatile loaded one for a clean one.

Since the scouring air current is very small and its inlet temperature at 19' is made the same as outlet temperature at 19, by means of valves 57, 51 and 49, it follows that the temperature of the roasting coffee is that of the gaseous flow at the roaster outlet 19 and as indicated by thermometer 23, as it has been confirmed in practice. Furthermore, since the heat application by burner 27 is relatively small, in order to develop a small rate of temperature rise on the coffee beans inside of roaster 13. It follows that the lag in temperature, if any, between that of the roasting beans inside of roaster drum 13 and that temperature indicated on thermometer 23 is practically none. If it is desired to expedite the roasting period, the firing of burner 27 can be started and maintained relatively large until the temperature of thermometer 23 reaches some 40 degrees F. before that required for the final temperature of thermometer 23. As for example with an ultimate roasting temperature of 390 degrees F., the firing should be reduced when thermometer 23 indicates 350 degrees F. It must be noted that, as stated hereinbefore, at the roasting temperature the inprisoned silver skin begins to burn, it means that exothermal changes take place inside the beans and no external firing will be required.

I claim:

1. An apparatus for roasting seeds, comprising; a cylindrical roasting drum integrally mounted on a tubular shaft and disposed to rotate inside of a cylindrical housing; the tubular shaft supported on bearings on the outside supports of the cylindrical housing; the inner conduit of the tubular shaft being divided in two sections by an integral plug located in the portion of the tubular shaft internal to the cylindrical roasting drum; one section, the inlet section, for admitting the scouring air flow into the interior of the cylindrical roasting drum and the other, the outlet section, for leading out of the cylindrical roasting drum the volatile loaded scouring air flow; the inlet section, of the tubular shaft, having means to discharge and distribute the flow of the scouring air flow inside of the cylindrical roasting drum and such means comprising; a radially directed tube, one end connected at a point near the plug on the inlet section of the tubular shaft, the other end connecting to an axially directed discharge perforated tube, parallel to the tubular shaft and in close proximity to the inner surface of the cylindrical roasting drum; the outlet section of the tubular shaft having perforations inside of the cylindrical roasting drum, near the plug dividing the tubular shaft and constituting the outlet channel for the volatile loaded scouring air flow and to direct the flow to the outside of the cylindrical roasting drum; the perforations of the outlet section of the tubular shaft protected by a helically-coiled shield so disposed that when the cylindrical roasting drum rotates and the shield is completely covered by the seeds, the helically-coiled shield will return to the interior of the cylindrical roasting drum any seeds that may try to work their way out; the bottom of the cylindrical housing open for the discharge and guide of the roasted seeds into a prearranged receptacle outside of the cylindrical housing and disposed below in close relation to the cylindrical roasting drum; burner means below the cylindrical roasting drum and inside of the cylindrical housing to supply the heating to the cylindrical roasting drum; a removable plate covering the burner means to shield the burner from falling seeds when the cylindrical roasting drum is discharging seeds; the bottom of the cylindrical housing open for the discharge and guide of the roasted seeds into a prearranged removable receptacle that is disposed below and in close proximity to the cylindrical roasting drum; an induced draft fan for the removal of the spent combustion gases located immediately above the cylindrical housing; the inlet of the induced draft fan connected at the uppermost portion of the cylindrical housing; a blower fan located adjacent to the induced draft fan, and adapted to direct the scouring air flow to the inlet section of the tubular shaft; the induced draft fan and the blower fan having a common drive shaft; electrical motor means to directly drive both the induced draft fan and the blower fan and also drive, through adequate reduction speed means, the cylindrical roasting drum; the inlet of the tubular shaft connected by means of a slip flange to the outlet of the blower; said connection from the outlet of the blower, first passing internally through the upper portion of the cylindrical housing, above the cylindrical roasting drum, forming a scouring air reheating duct, second outside of the cylindrical housing divided into two tubular connections, one connecting to the outlet of the induced draft fan with interposed valve means and the other connection, through valve means, to a first thermometer well to indicate the inlet scouring gas temperature and on the inlet of the tubular shaft; the inlet end of the tubular shaft equipped with internally directed tubing for the introduction of water to the interior of the cylindrical roasting drum for quenching the seeds when the roasting is completed and the firing is extinguished; the outlet end of the tubular shaft, connected by means of a slip flange, through a second thermometer well with a thermometer to indicate the temperature of the outlet scouring air that determines the roasting temperature of the seeds; a condenser to condense the volatiles in the scouring air, connected to the second thermometer well, the outlet for the scouring air of the tubular shaft by means of a slip flange; the condenser bottom hot gas inlet of the scouring air flow equipped with a drain valve so as to remove, when necessary, any liquid condensate from the interior of the condenser by gravity; the cooled scouring air outlet of the condenser, free from volatiles, discharging into the atmosphere; the cooling air inlet of the condenser, the scouring air flow, disposed to direct, in a counter flow manner, the cold scouring air flow that forms the cooling media of the condenser and the cooling air outlet of the condenser, the heated scouring air flow, connected through valve means interposed to the inlet of the blower.

2. An apparatus for roasting seeds according to claim 1; and the cold scouring air inlet to the condenser, comprising valve means to admit only cold air to the condenser.

3. An apparatus for roasting seeds according to claim 1; and the condenser equipped with flange means at all tubular connections so as to permit the removal and the replacing of the condenser for changing and by-product recovery.

4. An apparatus for roasting seeds according to claim 1; and the interior surface of the cylindrical roasting drum equipped with horizontal, axially directed rods, slightly disposed away from the inner surface of the cylindrical roasting drum for preventing the charge of seeds to slide when rotating and thus effecting a cascading action of the seeds in the interior of the cylindrical roasting drum.

5. An apparatus for roasting seeds according to claim

1; and the cylindrical roasting drum equipped with a swinging latched door to lock in a closed position when the roasting is in progress and latched in an open position when charging and discharging of the seeds is in progress; the internal cylindrical surface of the cylindrical roasting drum equipped with integral projecting small plates diagonally disposed so as to direct the seeds, when the cylindrical roasting drum rotates, to the open outlet swinging door discharge for unloading the cylindrical roasting drum.

References Cited in the file of this patent

UNITED STATES PATENTS

| | | |
|---|---|---|
| 119,959 | Ashcroft | Oct. 17, 1871 |
| 865,203 | Mustonen | Sept. 3, 1907 |
| 1,645,440 | McFarland | Oct. 11, 1927 |
| 2,497,501 | Himmel et al. | Feb. 14, 1950 |
| 2,593,983 | Chalupa | Apr. 22, 1952 |
| 2,614,043 | Lenz | Oct. 14, 1952 |
| 2,762,289 | Crutcher | Sept. 11, 1956 |